US009720930B2

(12) United States Patent
Bhadkaria et al.

(10) Patent No.: US 9,720,930 B2
(45) Date of Patent: Aug. 1, 2017

(54) TRAVEL MANAGEMENT

(75) Inventors: Saurabh Bhadkaria, Bangalore (IN); Gurdeep Singh Virdi, Bangalore (IN); Sanjoy Paul, Bangalore (IN)

(73) Assignee: ACCENTURE GLOBAL SERVICES LIMITED, Dublin (IE)

( * ) Notice: Subject to any disclaimer, the term of this patent is extended or adjusted under 35 U.S.C. 154(b) by 708 days.

(21) Appl. No.: 13/465,396

(22) Filed: May 7, 2012

(65) Prior Publication Data

US 2013/0197789 A1 Aug. 1, 2013

(30) Foreign Application Priority Data

Jan. 30, 2012 (IN) ............................ 337/CHE/2012

(51) Int. Cl.
*G06F 17/30* (2006.01)

(52) U.S. Cl.
CPC .............................. *G06F 17/30241* (2013.01)

(58) Field of Classification Search
CPC ............... G06F 17/30386; G06F 17/30; G06F 17/30241
USPC .......................................................... 707/758
See application file for complete search history.

(56) References Cited

U.S. PATENT DOCUMENTS 6,360,254 B1 * 3/2002 Linden et al. ................ 709/219
6,766,320 B1 * 7/2004 Wang .................. G06F 17/3043 707/E17.084
7,389,289 B2 * 6/2008 Solaro et al. ................. 707/711
2002/0010637 A1 * 1/2002 Lieu et al. ...................... 705/26
2002/0143462 A1 * 10/2002 Warren ......................... 701/200
2004/0193587 A1 * 9/2004 Yamashita ........................ 707/3
2004/0210572 A1 * 10/2004 Shin .................. G06F 17/30911 707/999.003
2005/0091188 A1 * 4/2005 Pal et al. .......................... 707/1
2006/0074881 A1 * 4/2006 Vembu et al. .................... 707/3
2007/0010941 A1 * 1/2007 Marsh ........................... 701/209
2007/0276597 A1 * 11/2007 Kato .................... G01C 21/367 701/431
2008/0167887 A1 7/2008 Marcken
2008/0167973 A1 * 7/2008 De Marcken .................. 705/27
(Continued)

FOREIGN PATENT DOCUMENTS

CN 101192215 6/2008
CN 101216921 7/2008
WO 2010/063821 A1 6/2010

OTHER PUBLICATIONS

European Patent Office, 'European Search Report on Application No. 12008578.2,' dated Sep. 30, 2013.
(Continued)

*Primary Examiner* — Ashish K Thomas
*Assistant Examiner* — Jedidiah Ferrer
(74) *Attorney, Agent, or Firm* — Mannava & Kang, P.C.

(57) ABSTRACT

A travel management system may include a client module to generate a request to update and/or search for data related to a trip. A database module may receive the request and communicate with a database. The database may include data organized in a trip data store table including unique keys respectively identifying trips. The database may further include index tables related to attributes of the trips and identified by the unique keys. The database module may obtain data related to the request from an index table corresponding to a unique key and forward a response to the client module.

21 Claims, 14 Drawing Sheets

117

| Trip Data Store Table | Column | Column Family |
| --- | --- | --- |
| | Trip MID (Key) | Trip XML Data |
| | ABC123 | <>XML Data </> |
| | XYZDEF | <>XML Data </> |

118

| Location Index Table | Column | Column |
| --- | --- | --- |
| Label | Value | Trip MID |
| Source | New York | ABC123 |
| Destination | Washington | ABC123 |

119

| Landmark Index Table | Column | Column |
| --- | --- | --- |
| Label | Value | Trip MID |
| Art | Art Shop | ABC123 |
| Coffee | ABC Coffee | ABC123 |

120

| Image Index Table | Column | Column |
| --- | --- | --- |
| Label | Value | Trip MID |
| Art | Art Shop | ABC123 |
| Coffee | ABC Coffee | ABC123 |

(56) References Cited

U.S. PATENT DOCUMENTS

| | | | | |
|---|---|---|---|---|
| 2008/0222566 | A1* | 9/2008 | Daughtrey | G06F 17/30398 707/E17.014 |
| 2008/0262717 | A1* | 10/2008 | Ettinger | 701/206 |
| 2009/0240429 | A1* | 9/2009 | Tanaka | G06F 17/3087 707/E17.018 |
| 2009/0282342 | A1* | 11/2009 | Fabris et al. | 715/733 |
| 2010/0145601 | A1 | 6/2010 | Kurtti et al. | |
| 2010/0332555 | A1* | 12/2010 | Mitsugi | G11B 27/322 707/803 |
| 2011/0238603 | A1* | 9/2011 | Peoples | G06N 7/005 706/12 |
| 2011/0302194 | A1 | 12/2011 | Gonzalez | |
| 2012/0084262 | A1* | 4/2012 | Dwarampudi et al. | 707/667 |

OTHER PUBLICATIONS

IP Australia, “Patent Examination Report No. 1” on Australia Application No. 2013200436, Dated Aug. 28, 2013.

Canadian Intellectual Property Office, ‘Office Action on Application No. 2,797,933,’ dated Jan. 23, 2015, 5 pages.

* cited by examiner

```
                                    125
<key id="ABC123">
121 --> <column id="location" name="source" value="New York" index="true" keyfield="true" />
        <column id="location" name="destination" value="Washington" index="true" keyfield="true" />
123 --> <column id="location" name="distance" value="170 miles" index="false" keyfield="true" />
        --- ----- ---- ---- ---- ----- ---- ---
122 --> <column id="landmark" name="Coffee" value="ABC Coffee" index="true" keyfield="true" />
        <column id="landmark" name="Art" value="Art Shop" index="true" keyfield="true" />
        ---- --- ----- ----- --- ----- ---- ---- ----
        <column id="image" name="Coffee" value="server location" index="false" keyfield="true" />
        <column id="image" name="Art" value="server location" index="false" keyfield="true" />
        ---- --- ---- ----- ---- ---- ----- ---- ---- - ---- --
</key>
```

| Location Key-field Table | Column | Column Family |
| --- | --- | --- |
| | Trip MID (Key | Trip XML Data |
| | ABC123 | <column name="source" value="New York"/><column name="destination" value="Washington"/><column name="distance" value="170 Miles"/> |
| | XYZDEF | <>XML Data</> |

FIG. 6

TRAVEL MANAGEMENT

BACKGROUND

Travelling between source and destination locations may use information, such as, for example, route to the destination and travel time. Travelling may also use information related to landmarks or points of interest along a route, such as, for example, restaurants, fuel stations, monuments, sights of interest, and location of a friend's home. Information such as sights of interest to a particular user and location of a friend's home may not generally be captured in existing map or navigation systems, for example, due to limitations in data storage, management and efficient retrieval capabilities of travel related systems. Further, if multiple travelers are involved, travelling may use information related to pick-up time for such travelers, location and timing of areas of pick-up and estimated arrival time at such pick-up areas.

Known travel related systems provide navigation based on static data and updates by instant messaging (IM) or short message service (SMS). Such systems may use algorithms based on shortest path, highway use or mode of transport, which rely on static data. Such systems however may not leverage information based on user experiences, or information which changes dynamically as a user continues on a trip. Hence, the state of any given system user may not be maintained.

The foregoing features of travel related systems may be based on limitations in data storage, management and retrieval capabilities of such systems. For example, travel related systems may use relational databases to store, manage and retrieve information. However, relational databases have limited capabilities for handling large sets of unstructured data. Relational databases also have limited capabilities for handling significant data growth over a short time-period and a high rate of concurrent access.

For example, a user of a travel related system using a relational database may request landmark, reviews and images for a point of interest. The relational database may normalize the data related to the point of interest, but would require joins for each component (e.g., landmark, reviews or images) of the request. For any additional components (e.g., ratings per review) of a request, the query would require additional joins. Thus, each component of a query would significantly increase the size of data for a search. For example, if a trip includes $n_c$ comments, $n_i$ images, $n_l$ landmarks, and $n_r$ reviews, the relational database including, for example, $n_t$ trips, would include at least $n_t*(n_c+n_i+n_l+n_r)$ records. For a database of millions of trips, the number of overall records would thus be based, for example, on the number of trips times the related comments, images, landmarks, reviews and other factors. Such multiplicity of the number of overall records and other aspects of relational database functionality could thus limit capabilities of a travel related system for handling, for example, large sets of unstructured data, significant data growth and high rate of concurrent access.

BRIEF DESCRIPTION OF DRAWINGS

The embodiments are described with reference to the following figures:

FIG. 5 illustrates an Extensible Markup Language (XML) example in a trip data store table for the travel management system of FIG. 1, according to an embodiment;

FIG. 6 illustrates an example of a location key-field table for the travel management system of FIG. 1, according to an embodiment;

DETAILED DESCRIPTION

Figure 1:
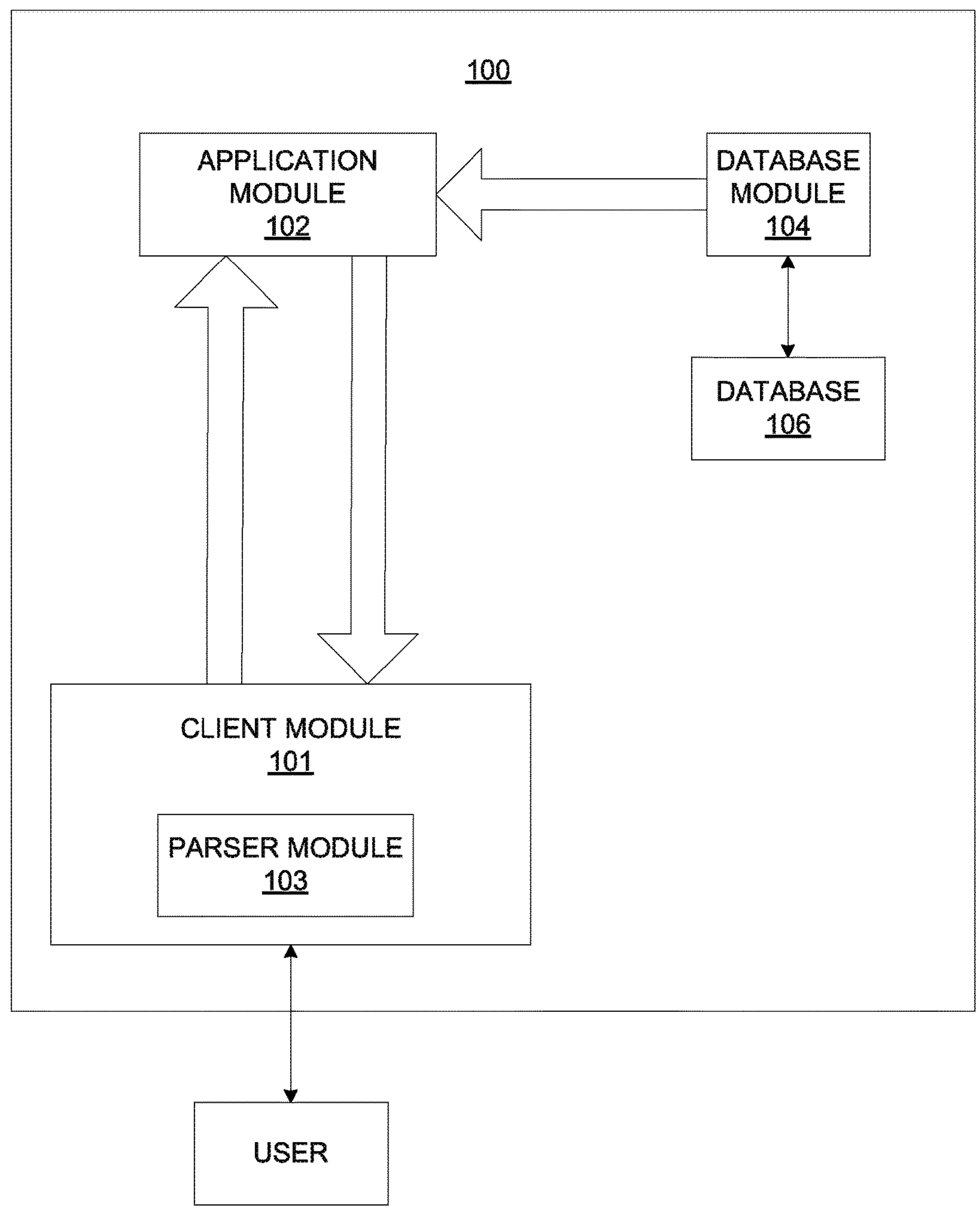
FIG. 1 illustrates a high-level system diagram for a travel management system, according to an embodiment.

For simplicity and illustrative purposes, the principles of the embodiments are described by referring mainly to examples thereof. In the following description, numerous specific details are set forth in order to provide a thorough understanding of the embodiments. It will be apparent that the embodiments may be practiced without limitation to all the specific details. Also, the embodiments may be used together in various combinations.

1. Overview

For a trip between source and destination locations, the travel management system may store the trip in a database with all unique user experiences, such as, for example, trip comments, trip landmarks, trip ratings, trip images and trip landmark reviews. This information related to a trip may be readily shared and downloaded with other users. The travel management system may maintain a state of all members belonging to a community of users subscribed to the system. As discussed below, the travel management system provides, for example, customizable navigation, customizable routes with landmarks, live sharing of traffic update information among a closed group, authoring of routes and sharing thereof within a closed group, adherence to timelines in trips including multiple stops, runtime monitoring and assist from remote locations.

As described in detail below, the travel management system may generally include a client module to generate a request to update and/or search for data related to a trip. A database module may receive the request and communicate with a database. The database may include data organized in a trip data store table including unique keys respectively identifying trips. The database may further include index tables related to attributes of the trips and identified by the unique keys. The database module may obtain data related to the request from an index table corresponding to a unique key and forward a response to the client module.

For the travel management system described above, the index tables may include value and the unique key pairs, and the value may be related to an attribute of a trip. The request and the response may be a XML based request and response. The XML based response may be rendered into a HyperText Markup Language (HTML) view for presenting to a user. The unique key may be a unique identification related to the trip from a source location to a destination location. The index table may include an index and a key-field, where an index set to true may determine that a value related to an attribute of a trip is searchable, and a key-field set to true may determine that the value is to be presented to a user as a search result. The database may further include key-field tables related to the attributes of the trips and identified by the unique keys. Corresponding values for key-fields set to true may be stored in a corresponding key-field table. The database module may query the key-field tables based on the request and forward a preliminary response to the client module. Upon approval of the preliminary response by the user, the database module may load appropriate content from the trip data store table identified by the unique key. The trip data store table may store XML data related to the trip in a single row in a multiple nodes form. The client module may provide for live sharing of traffic update information among a closed group of users. Hence, the system provides for dynamic management of information and maintenance of the state of any given system member. The client module may provide for access to a first user's trip information to an authorized second user. The client module may provide for tracking and monitoring of a user in real time. The client module may also provide an authorized user the ability to assist a traveler in real-time by updating the trip with alternate route maps, landmarks, images, comments and/or reviews.

As described in detail below, a method for travel management may include receiving a request to update and/or search for data related to a trip. The method may further include communicating with a database including the data related to the trip. The method may include organizing the data in a trip data store table including unique keys respectively identifying trips, and further including index tables related to attributes of the trips and identified by the unique keys. The method may include obtaining data related to the request from an index table corresponding to a unique key and forwarding a response to a user.

For the method described above, as similarly described for the travel management system, the index tables may include value and the unique key pairs. The value may be related to an attribute of a trip. The index table may include an index and a key-field, and an index set to true may determine that a value related to an attribute of a trip is searchable, and a key-field set to true may determine that the value is to be presented to the user as a search result. The database may further include key-field tables related to the attributes of the trips and identified by the unique keys. Corresponding values for key-fields set to true may be stored in a corresponding key-field table. The method may further include querying the key-field tables based on the request, forwarding a preliminary response to the user, and upon approval of the preliminary response by the user, loading appropriate content from the trip data store table identified by the unique key. The trip data store table may store XML data related to the trip in a single row in a multiple nodes form.

As described in detail below, a non-transitory computer readable medium may have stored thereon a computer executable program for travel management. The computer executable program, when executed, may cause a computer system to receive a request to update and/or search for data related to a trip. The computer executable program may cause the computer system to communicate with a database including the data related to the trip. The computer executable program may cause the computer system to organize the data in a trip data store table including unique keys respectively identifying trips, and further including index tables related to attributes of the trips and identified by the unique keys. The computer executable program may cause the computer system to obtain data related to the request from an index table corresponding to a unique key and forward a response to a user.

The travel management system thus provides an efficient framework for storing and organizing data related to a trip, and further, for efficient sharing of data from a client to the database and vice-versa. The travel management system further provides for efficient handling of large sets of unstructured data, elastic scalability in management of rapid growth of data, and the ability to handle high rate of concurrent access.

The travel management system may provide customizable navigation. For example, for known map sites, a route may be based on a fixed criterion such as, for example, shortest path, shortest time or highway-only to a destination. A route provided by such a site however does not provide the ability to follow a custom route previously taken, for example, by a friend or family member, that may include personalized experiences of the previous traveler(s) as specified, for example, through photos of landmarks and annotations. In addition, such sites do not provide support to a traveler who may request online monitoring and assistance either at specific times during the trip or on a continuous basis. The travel management system provides for the download of customized routes between any two points, where a route may be customized, for example, by a friend or family member.

The travel management system provides customizable routes with landmarks. For example, for landmarks on a route, the travel management system allows a user to author personalized landmarks on the route and provide appropriate user-specific details.

The travel management system provides for live sharing of traffic update information among a closed group. Members of a group may navigate dynamically and reach their destination in the least possible time. The system provides for live updates that include, for example, information related to traffic, accidents, road blocks and construction. The system may be implemented as a mobile application for transmitting live route updates to a community of the system users.

The travel management system provides for authoring of routes and sharing thereof within a closed group. For example, in the event of no route information on a map, a system user may record and share a route with a community of users associated with the system. A user may also record and share information, such as, for example, sights of interest and location of a friend's home.

The travel management system facilitates adherence to timelines in trips including multiple stops. For example, if a trip requires strict adherence to a timeline and multiple stops, the travel management system allows all members related to such a trip to not only obtain instant update of the current location of the user in-route (e.g., to monitor a user), but also to remotely assist the user in-route with navigation based on current road conditions. The travel management system may also assist a traveler by drawing an alternate path or by drawing landmarks that get shared with the traveler at runtime.

The travel management system may also assist a traveler to prepare for a trip in advance by drawing landmarks, uploading reference images, uploading landmarks and by providing for download of the entire custom trip information to a mobile device and use that as a reference. The travel management system may also consider multiple parties on a trip, providing each party with the ability to keep track of the other party members during the trip and assisting one another.

The travel management system also allows a user to set automated alert preferences. For example, the system may track the distance travelled and based on the distance, set alert preferences (e.g., an automatic SMS) to the user or a specified person.

The travel management system thus provides for storage, management and efficient retrieval of information. The system may store routes between any two points, personalized by users with their own landmarks of interest. Other users in the future may retrieve the personalized trip routes and experience the routes in the same manner as experienced by the route author. A route may be personalized with location images, points of interest, landmarks, alternate routes, comments and reviews for the landmarks. Moreover, a traveler who is about to embark on a trip may efficiently browse through all possible personalized trip experiences between the traveler's points of interest from a given travel management site before making a choice as to the route. The traveler may further download the desired route into a navigation system, for example, of a mobile device with a single click.

The systems and methods described herein provide a technical solution to the technical problem of travel management and data storage, management and efficient retrieval for large sets of unstructured data, for data growth over a short time-period, and for a high rate of concurrent access. In many cases, data storage, management and retrieval for large sets of unstructured data may limit capabilities, such as, for example, response time and the number of users that may access the data at any given time for a travel related system. The type of data storage and management may also increase the data storage requirements for a system, thus increasing system cost. The systems and methods according to the embodiments provide the technical solution of providing travel management by communicating with a database including data organized in a trip data store table including unique keys respectively identifying trips, index tables related to attributes of the trips and identified by the unique keys, and key-field tables related to the attributes of the trips and identified by the unique keys.

2. System

FIG. 1 illustrates a high-level system diagram for the travel management system 100, according to an embodiment. Referring to FIG. 1, the system 100 may include a client module 101. The client module 101 may be designed to make XML based requests to an application module 102 to be processed. The client module 101 may also include, for example, mobile or web-based communication. The response to the client module 101 may also be a XML based response. The XML response may be rendered into HTML views to be presented to a user. The client module 101 may be equipped with a parser module 103 to convert the XML response into HTML views. Alternatively, the application module 102 and its associated application layer or service layer may include the parser module 103. The parsing of the XML response at the client end (i.e., at the client module 101) may be performed using, for example, JavaScript. Parsing the XML response at the client end may increase the speed of the parsing operation as opposed to the parsing being performed at the application module 102.

The application module 102 may provide a communication medium between the client module 101 and a database module 104. The application module 102 may read the XML for data manipulation queries and perform decisions, such as, for example, updating correct index tables, described in detail below, in a database 106.

Figure 2:
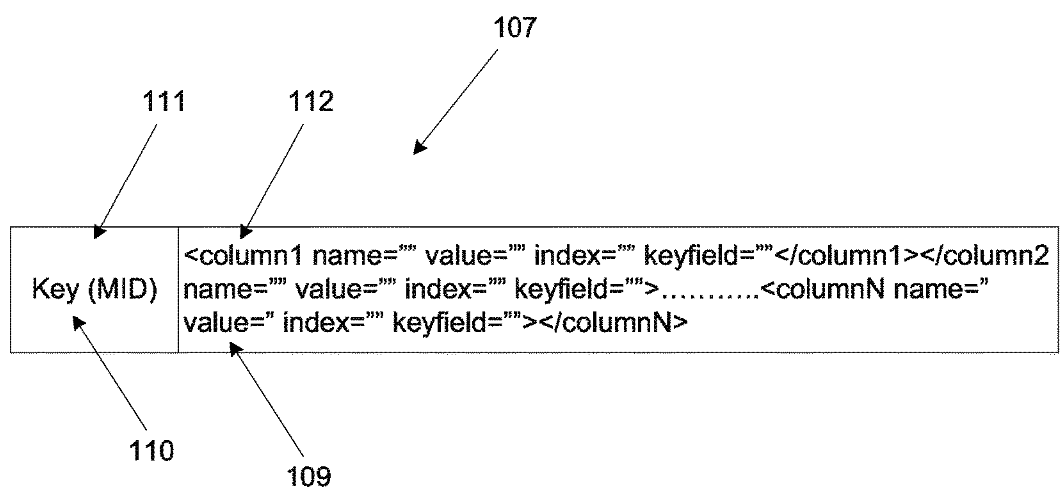
FIG. 2 illustrates an example of a data model for the travel management system of FIG. 1, according to an embodiment.

The database 106 may include multiple index tables, such as, for example, a location index table, an image index table, and a landmark index table. Referring to FIG. 2, an example of a data model 107 for the travel management system 100 is illustrated. As shown in FIG. 2, each index table (e.g., location index table, image index table, and landmark index table) for the data model 107 may include a value 109 and a key (MID) 110 pair. The rows are shown at 111 and the columns at 112. MID may be a MetadatatagId, which may be, for example, a 16 digit unique identification (ID). The Key (MID) may also be used to generate a unique trip uniform resource locator (URL) that can be used by the trip author (i.e., primary user) to invite (or deny) specific users to obtain access to a live trip. Once approved, the other users may obtain full access to all the metadata about the trip authenticated by the original trip author.

Figure 3:
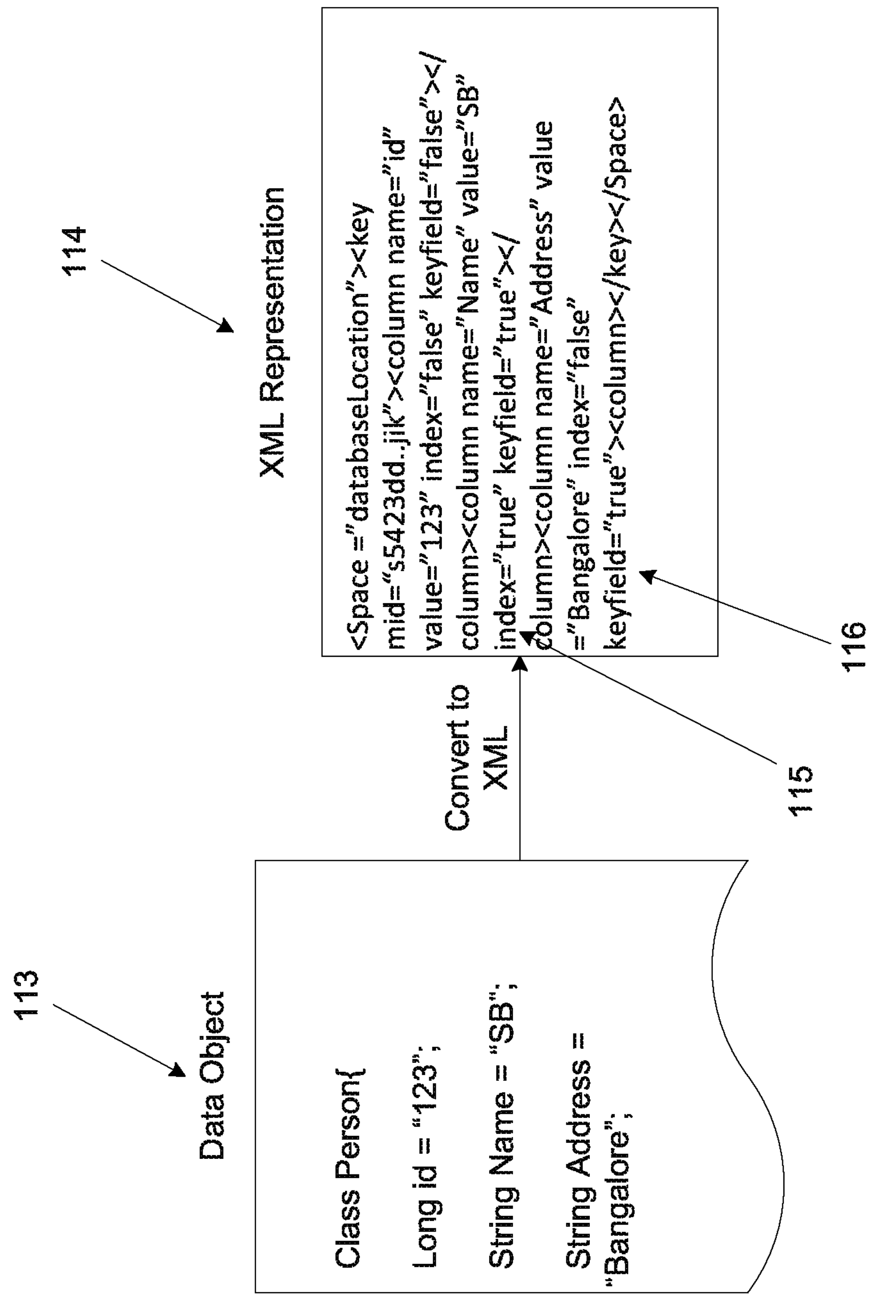
FIG. 3 illustrates an example of an object store for the travel management system of FIG. 1, according to an embodiment.

As shown in FIGS. 2 and 3, an example of a simple object store is shown at 113 and a converted XML at 114. For the simple object store at 113, for an example for ID="123", string name="SB", and string address="Bangalore", the converted XML is shown at 114. For the converted XML at 114, for an index column at 115, a column defined as index="true" determines that a value is searchable. For a key-field column at 116, a column defined as key-field="true" determines that a value is presented as part of a view to the client machine (e.g., the user) as a result of a search result. The index and key-field columns may allow the system 100 to control variable and text values for search and visual presentation.

Figure 4:
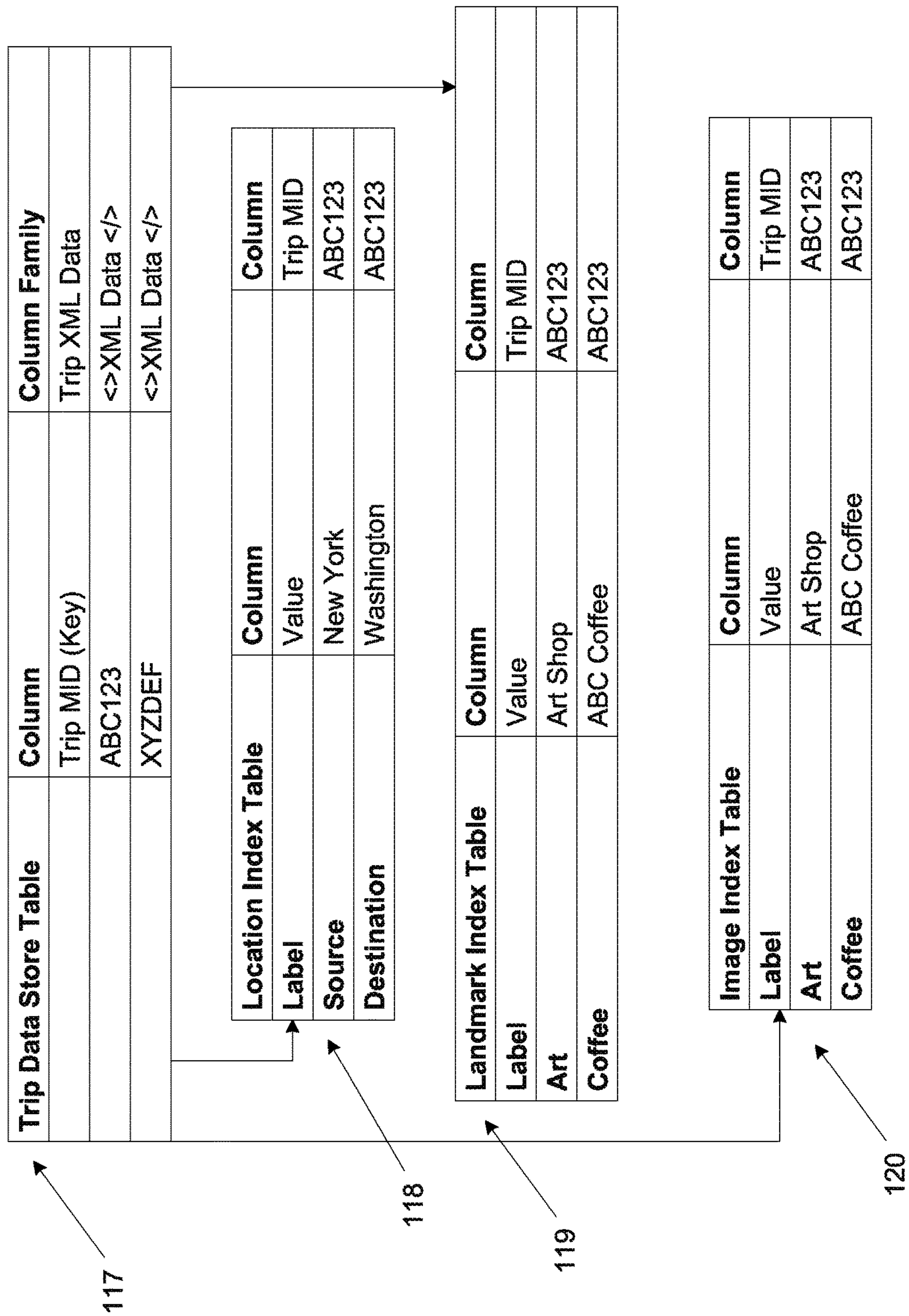
FIG. 4 illustrates an example of a physical data layout for the travel management system of FIG. 1, according to an embodiment.

As shown in FIG. 4, an example of sample data for the travel management system 100 is shown. For example, for a trip data store table 117, the corresponding tables may include a location index table 118, a landmark index table 119 and an image index table 120. The XML data in the trip data store table 117 may store the entire XML data related to a trip in a single row in a multiple nodes form. The trip data store table 117 may also include multiple columns. Data related to a trip may be stored in the XML format in a single row that is linked with a unique ID. For example, the unique ID may be the row key (MID) 110 (see FIG. 2).

Referring to FIG. 5, a XML example of the trip data store table 117 is shown. For the XML example, at 121, id="location" informs the system 100 that the location index table 118 needs to be populated if index="true". Similarly, at 122, id="landmark" informs the system 100 that the landmark index table 119 is to be updated if index="true". At 123, since the name attribute is not indexed to true (i.e., index="false"), the value is not saved in the location index table 118. If a user were to search for comments, images and reviews of the ABC coffee landmark, the search request would proceed directly to the landmark index table 119 to obtain the trip MID. Based on the trip MID, the system 100 may load the trip XML from trip data store table 117. The trip XML may include all data stored in a column family manner in XML format. The XML result may be processed at the client side (i.e., at the client module 101) to create the required HTML views.

Based on the foregoing, compared, for example, to a relational database, no complex joins are needed to combine the data, resulting in a reduction in speed of data retrieval. If any new functionality is to be added to the system 100, the data does not need to be normalized and no new tables are needed. Instead, the existing data model may be updated and values may be saved in a XML format in a column family without changing the database or adding new columns manually.

Compared to databases, such as, for example, relational databases, the amount of data in the database 106 may be reduced. For example, since each trip is stored as a single record, for $n_t$ trips, the database 106 would include $n_t$ records, as opposed at least $n_t$*($n_c$+$n_i$+$n_l$+$n_r$) records (where $n_c$=comments, $n_i$=images, $n_l$=landmarks and $n_r$=reviews). The trip data store table 117 may also be loaded on demand. For example, the trip data store table 117 may only be accessed when the trip MID is known. Prior to this, the index tables (e.g., location index table 118, landmark index table 119 and image index table 120) and key-field tables (e.g., location key-field table 124 of FIG. 6, similar corresponding landmark and image key-field tables are not shown) may serve all incoming data retrieval requests, thus reducing overhead on the database 106. For example, when a search is requested on a location, the search may proceed to the location index table 118. The exact matches in the location index table 118 (for one or multiple trip IDs) may be obtained for the requested location, and a XML response may be created.

Referring to FIG. 6, an example of the location key-field table 124 for the travel management system 100 is illustrated. The generated XML response may be the responsibility of the key-field tables, which are similar to index tables. Referring to FIGS. 5 and 6, for the trip data store table 117, every location column that has key-field set to "true" may store the corresponding value in the location key-field table 124 and the view XML may be sent to a user without loading the trip data store table 117.

In order to limit the amount of data loaded for any particular search, as discussed above, the trip data store table 117 may be loaded on demand after loading of the key-field tables. For example, once the key-field tables are searched, upon approval by a user to load a particular record, the trip data store table 117 may be loaded. Referring to FIG. 5, since all the three location columns 125 have key-field set to true, all three corresponding values may remain in the database 106 as the XML column family. Thus, when a user searches for a record in the system 100, the user may be presented with links to the most relevant records, with the links being formed using the key-field tables. Thus, as discussed above, the trip data store table 117 may be loaded on demand when a user requests further review of a record. Until then, the key-field tables may be used to present links to the most relevant records for a search.

Figure 7:
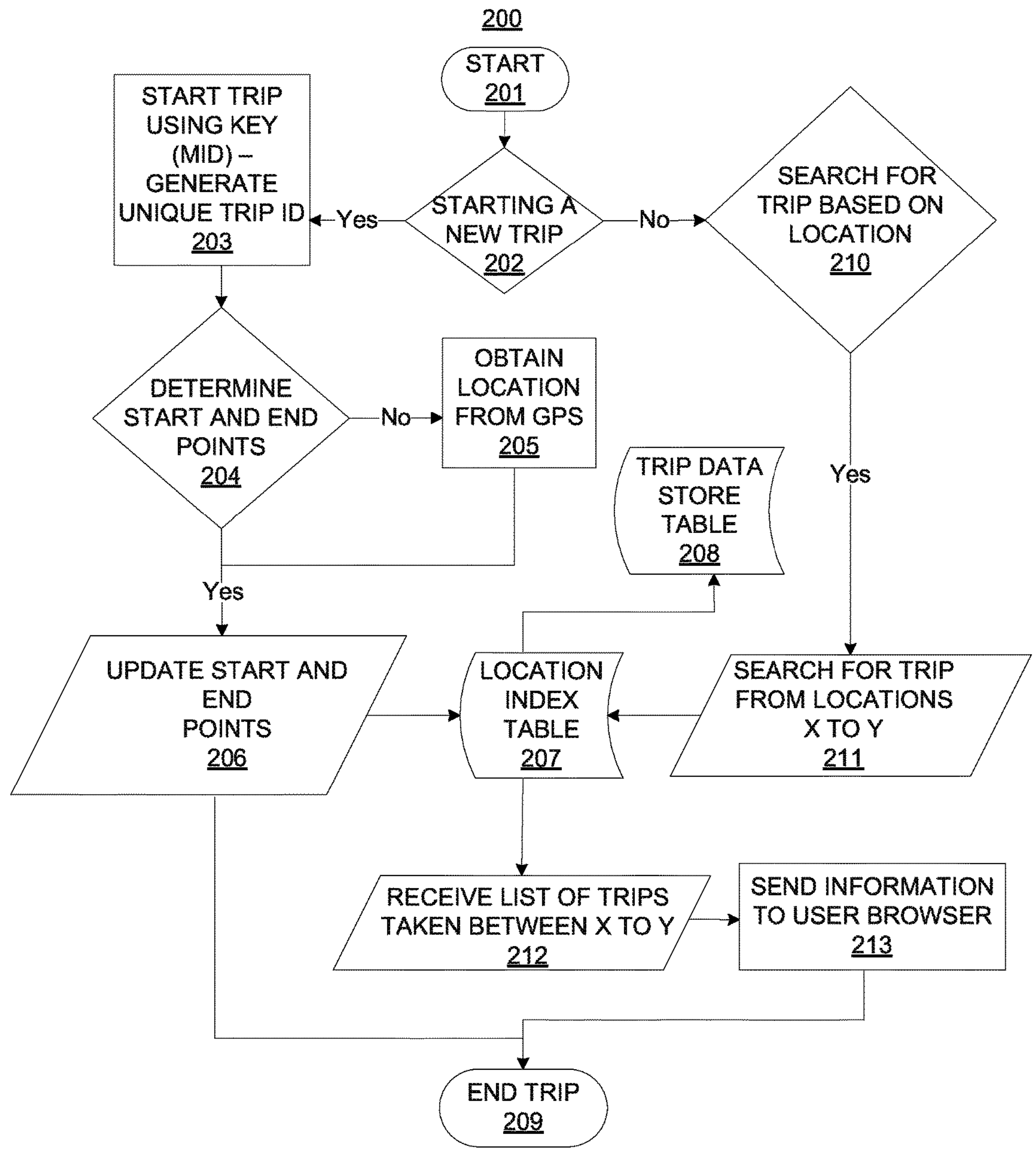
FIG. 7 illustrates a flowchart for updating a new trip and searching for an existing trip, according to an embodiment.
Figure 8:
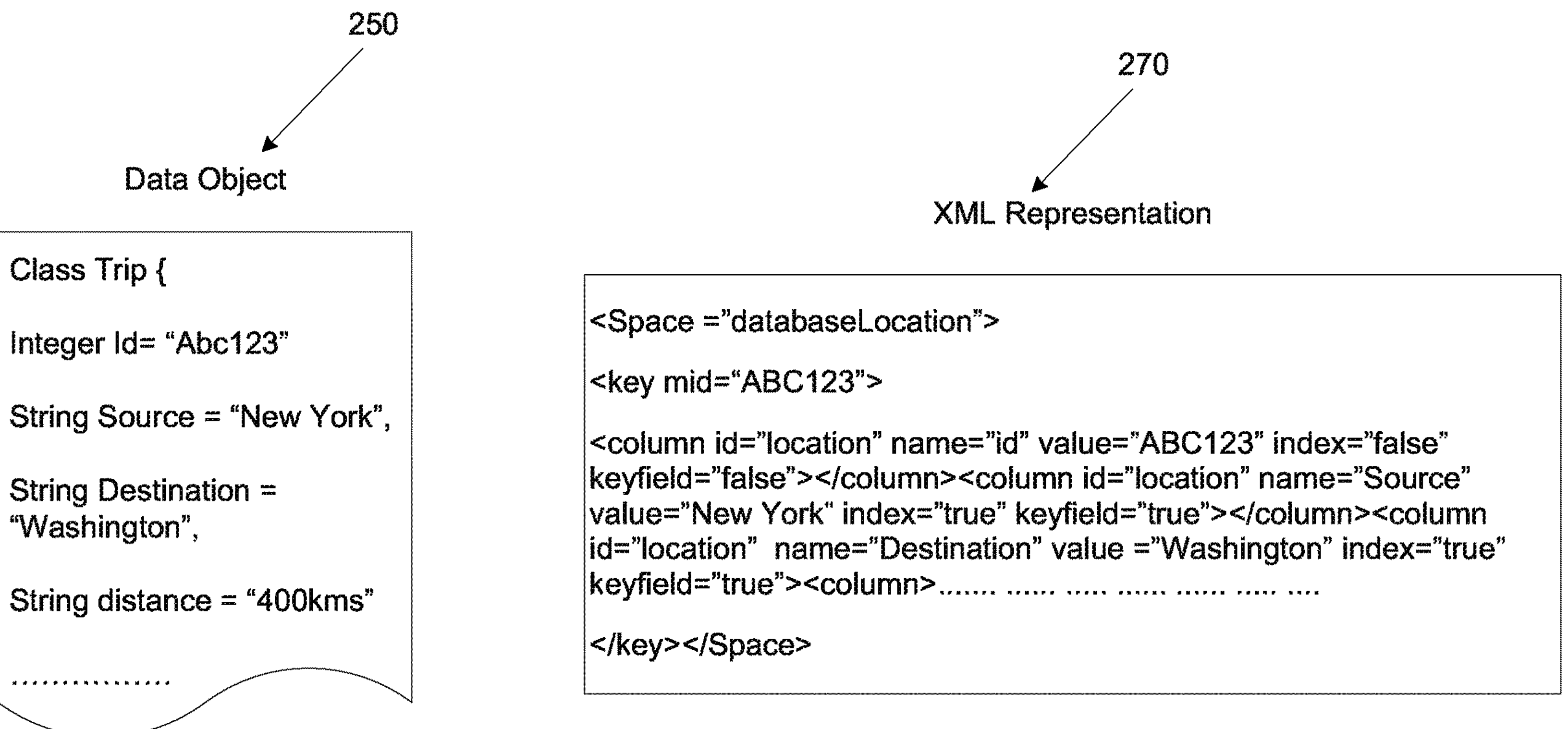
FIG. 8 illustrates an example of a data object and related XML representation for the flowchart of FIG. 7, according to an embodiment.

Referring next to FIGS. 7 and 8, FIG. 7 illustrates a flowchart 200 for updating a new trip and searching for an existing trip, and FIG. 8 illustrates an example of a data object 250 and related XML representation 270 for the flowchart of FIG. 7, according to an embodiment.

Referring to FIG. 7, at block 201, a user may start a trip. At block 202, if starting a new trip, the system 100 may proceed to block 203, where the trip may be started using a key (MID) or the system 100 may generate a unique trip ID. At block 204, the system 100 may determine the start and end points of the trip based on user input. At block 205, if no user input is obtained, the system 100 may obtain the locations using global positioning system (GPS). At block 206, if user input is obtained as to the start and end points, the system 100 may update the start and end points in the location index table 118 (see block 207) against the particular trip. At block 208, the trip data store table 117 may be updated. At block 209, the user may complete the trip. At block 210, the system 100 may proceed from block 202 if a user is to search for a trip based on location. At block 211, the user may search for a trip from locations X to Y. Based on the inputs of locations X to Y, the system 100 may proceed to the location index table 118 at block 207. At block 212, a list of trips taken between locations X to Y may be received from the location index table 118 (or from multiple location index tables). At block 213, the received information may be sent back to a user's browser. At block 209, the user may complete the trip.

Referring to FIG. 8, an example of an update operation for a trip from New York to Washington is discussed. The data model for the update operation may include the data object 250 and related XML representation 270. For the XML representation 270, since the column name of source and destination are marked as index="true", the system 100 may take both values (i.e., New York and Washington) and update (see FIG. 7) both values in the location index table 118 with the trip ID. The values may be saved in the location index table 118 (see FIG. 4).

Referring to FIG. 8, an example of a search operation for a trip from New York to Washington is discussed. For example, referring to FIG. 4, the search for keywords New York and Washington may be performed in the location index table 118. The search result returns the trip MID="ABC123". As shown in FIGS. 4 and 7, the trip MID may then be used to obtain the trip data XML from the trip data store table 117.

Figure 9:
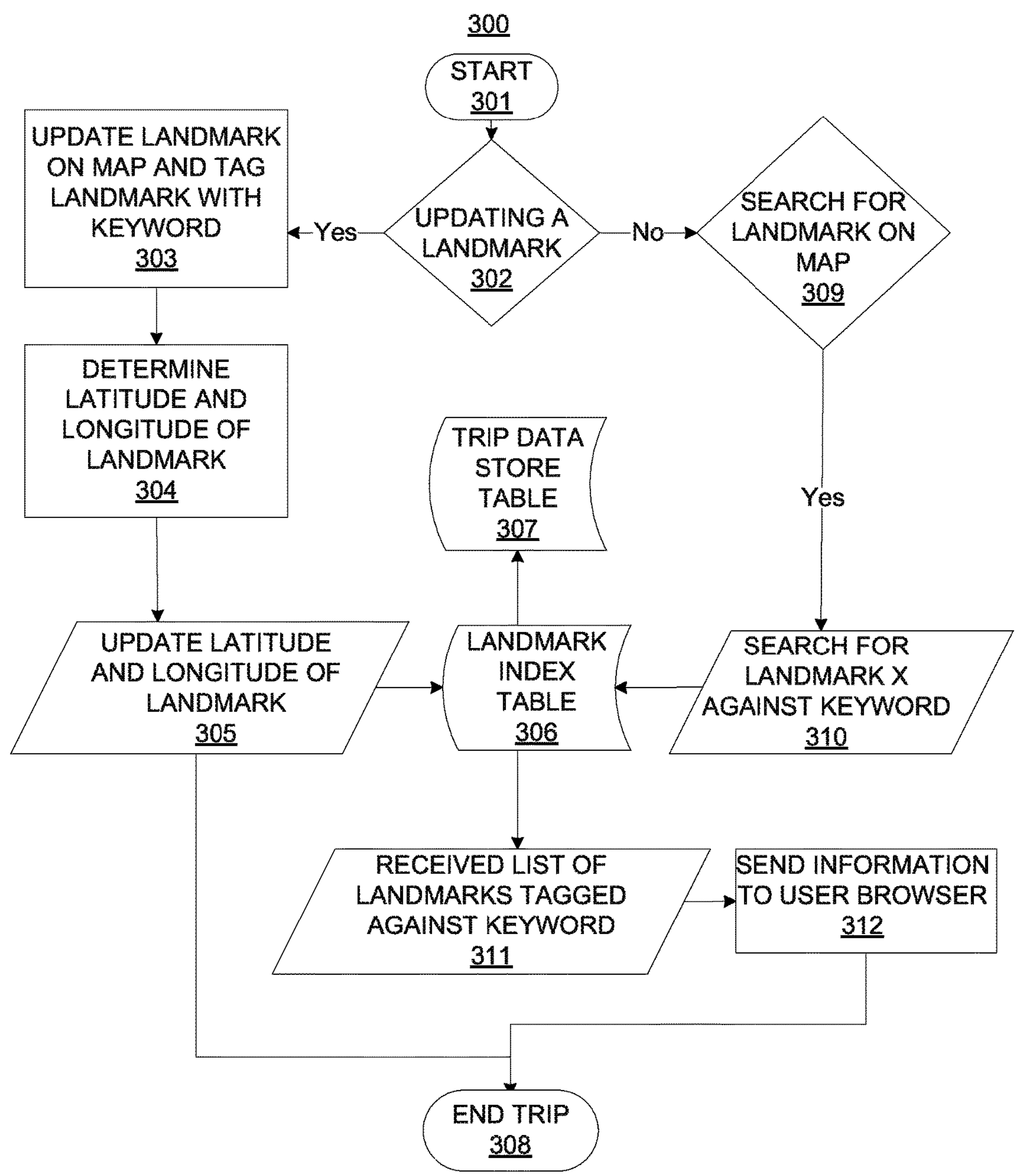
FIG. 9 illustrates a flowchart for updating landmarks over a trip and searching for a landmark, according to an embodiment.
Figure 10:
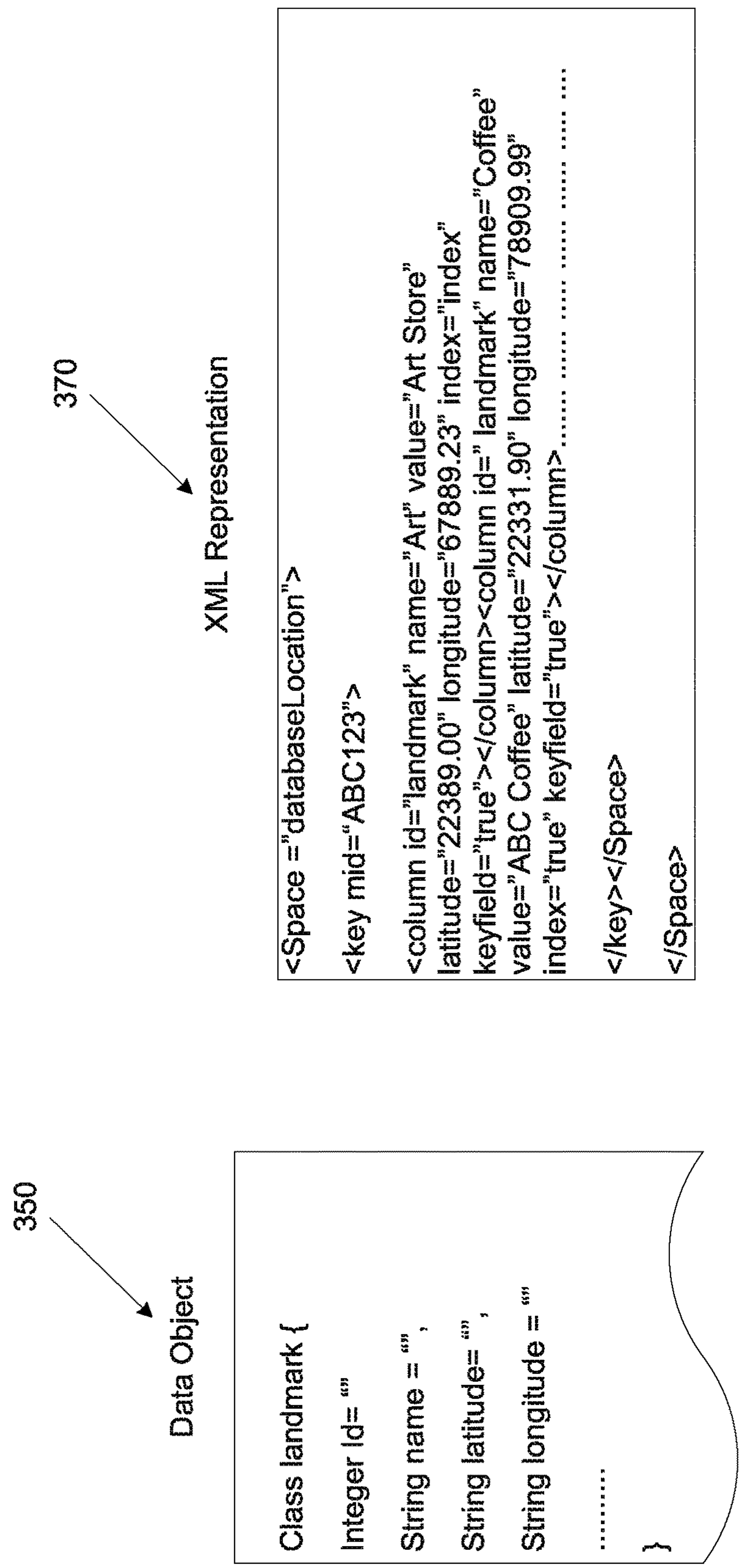
FIG. 10 illustrates an example of a data object and related XML representation for the flowchart of FIG. 9, according to an embodiment.

Referring next to FIGS. 9 and 10, FIG. 9 illustrates a flowchart 300 for updating landmarks over a trip and searching for a landmark, and FIG. 10 illustrates an example of a data object 350 and related XML representation 370 for the flowchart of FIG. 9, according to an embodiment.

Referring to FIG. 9, at block 301, a user may start a trip. At block 302, if updating a landmark, the system 100 may proceed to block 303 for updating a landmark on a map using, for example, a phone or a web browser, and tagging the landmark with a keyword (e.g., friend's home, ABC Coffee). At block 304, the system 100 may determine the latitude and longitude of a landmark. At block 305, the system 100 may update the latitude and longitude of the landmark in the landmark index table 119 (see block 306) with the key (MID) for a trip. At block 307, the trip data store table 117 may be updated. At block 308, the user may complete the trip. At block 309, the system 100 may proceed from block 302 if a user is to search for a landmark on a map. At block 310, the user may search for a landmark (e.g., landmark X) against a keyword. The search request may proceed to the landmark index table 119 at block 306. At block 311, a list of landmarks tagged against the keyword may be received. At block 312, the received information may be sent back to a user's browser. At block 308, the user may complete the trip.

Referring to FIG. 10, an example of an operation for updating landmarks is discussed. The data model for the update operation may include the data object 350 and related XML representation 370. For example, referring to FIG. 10, the XML represents the landmarks of trip ID ABC123. For updating the landmarks, for example, in the landmark index table 119 of FIG. 4, the index and the key field column attributes may be set to true for landmarks. The values for each landmark may be saved in the landmark index table (e.g., landmark index table 119 of FIG. 4) against the trip ID (i.e., key (MID)). For searching for landmarks, for example, searching for all the trips having ABC Coffee as landmarks, the keyword "ABC Coffee" may be directly searched in the landmark index table. For example, the keyword "ABC Coffee" may be directly searched in the landmark index table 119 of FIG. 4. Since the results may have multiple trips IDs, each XML may be retrieved from the trip data store table 117 against the trip ID.

Figure 11:
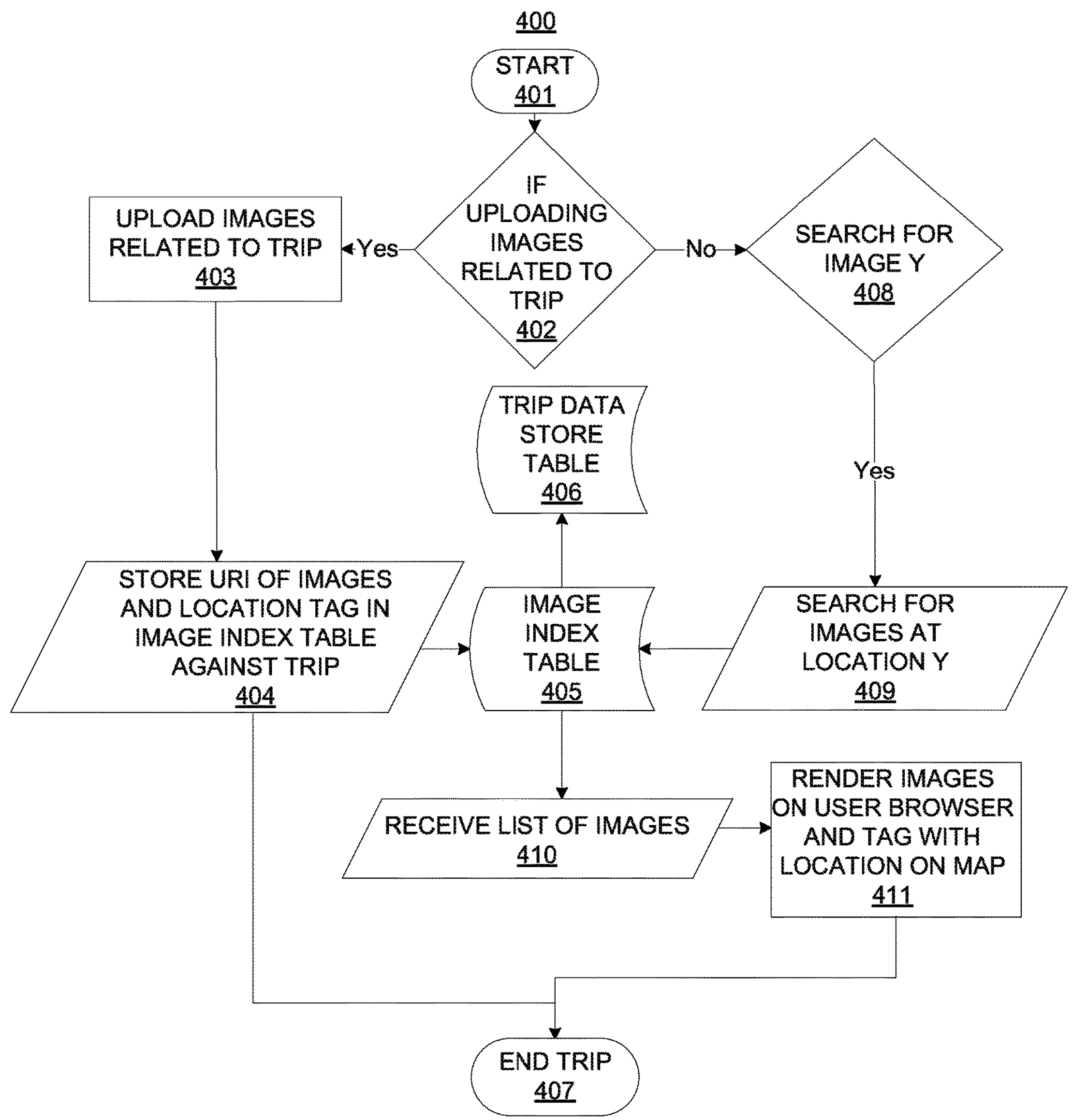
FIG. 11 illustrates a flowchart for updating images and searching for an image based on its location tag, according to an embodiment.
Figure 12:
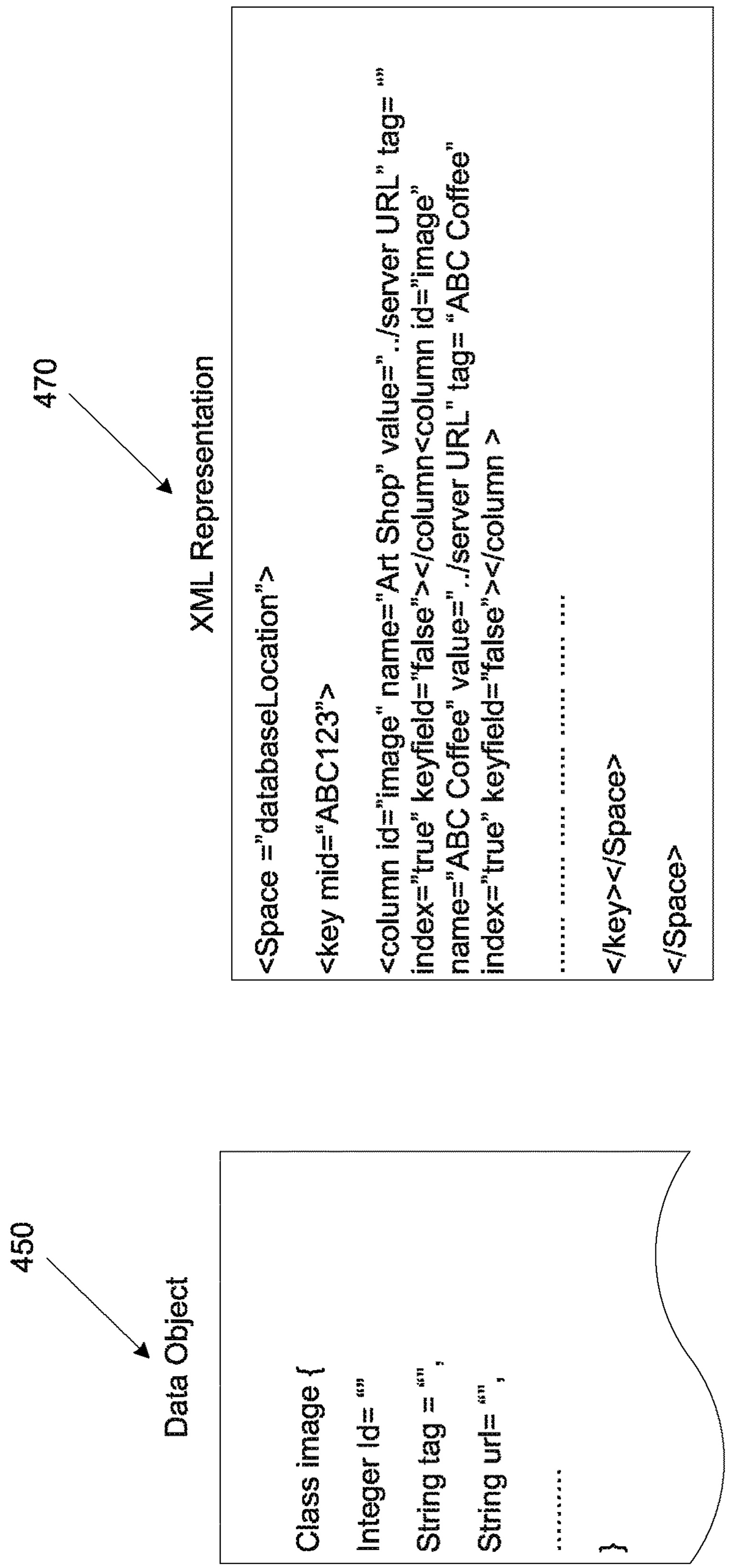
FIG. 12 illustrates an example of a data object and related XML representation for the flowchart of FIG. 11, according to an embodiment.

Referring next to FIGS. 11 and 12, FIG. 11 illustrates a flowchart 400 for updating images and searching for an image based on its location tag, and FIG. 12 illustrates an example of a data object 450 and related XML representation 470 for the flowchart of FIG. 11, according to an embodiment.

Referring to FIG. 11, at block 401, a user may start a trip. At block 402, if the user is to upload images related to a trip, at block 403, the images related to a trip may be uploaded. At block 404, the external uniform resource identifier (URI) of the images may be stored and the location of the images may be tagged in the image index table (at block 405) against the trip. For example, the images may be stored and the location of the images may be tagged in the image index table 120 of FIG. 4. At block 406, the trip data store table 117 may be updated. At block 407, the user may complete the trip. At block 408, the system 100 may proceed from block 402 if a user is to search for an image (e.g., image Y). At block 409, the system 100 may search for images at location Y and proceed to the image index table 120. At block 410, a list of images may be received. At block 411, the received information may be sent back to a user's browser (e.g., displayed on the user's browser) and tagged with the location on a map. At block 407, the user may complete the trip.

Referring to FIG. 12, an example of an operation for uploading images is discussed. The data model for the uploading operation may include the data object 450 and related XML representation 470. For example, referring to FIG. 12, for updating, the values for the indexed columns may be saved in the image index table. For example, the values for the indexed columns may be saved in the image index table 120 of FIG. 4. The image index table 120 may include the tag and the trip ID associated with the image. For searching for images, trips may be searched against a keyword. For example, while searching for an image, the control may proceed directly to the image index table 120. The matched trip ID against the tag may be returned and the trip ID may be used to load trips from the trip data store table 117.

Based on the discussion herein with respect to FIGS. 1-6 and the related update and search capabilities of the travel management system 100 described with respect to FIGS. 7-12, the system 100 provides for the download of customized routes between any two points, where a route may be customized, for example, by a friend or family member. For landmarks on a route, the travel management system 100 allows a user to author personalized landmarks on the route and provide appropriate user-specific details. The travel management system 100 provides for live sharing of traffic update information among a closed group. Members of a group may navigate dynamically and reach their destination in the least possible time. The system provides for live updates that include, for example, information related to traffic, accidents, road blocks and construction. The travel management system 100 provides for authoring of routes and sharing thereof within a closed group. For example, in the event of no route information on a map, a system user may record and share a route with a community of users associated with the system. A user may also record and share information, such as, for example, sights of interest and location of a friend's home. The travel management system 100 also facilitates adherence to timelines in trips including multiple stops. For example, if a trip requires strict adherence to a timeline and multiple stops, the travel management system allows all members related to such a trip to not only obtain instant update of the current location of the user in-route, but also to remotely assist the user in-route with navigation based on current road conditions.

3. Method

Figure 13:
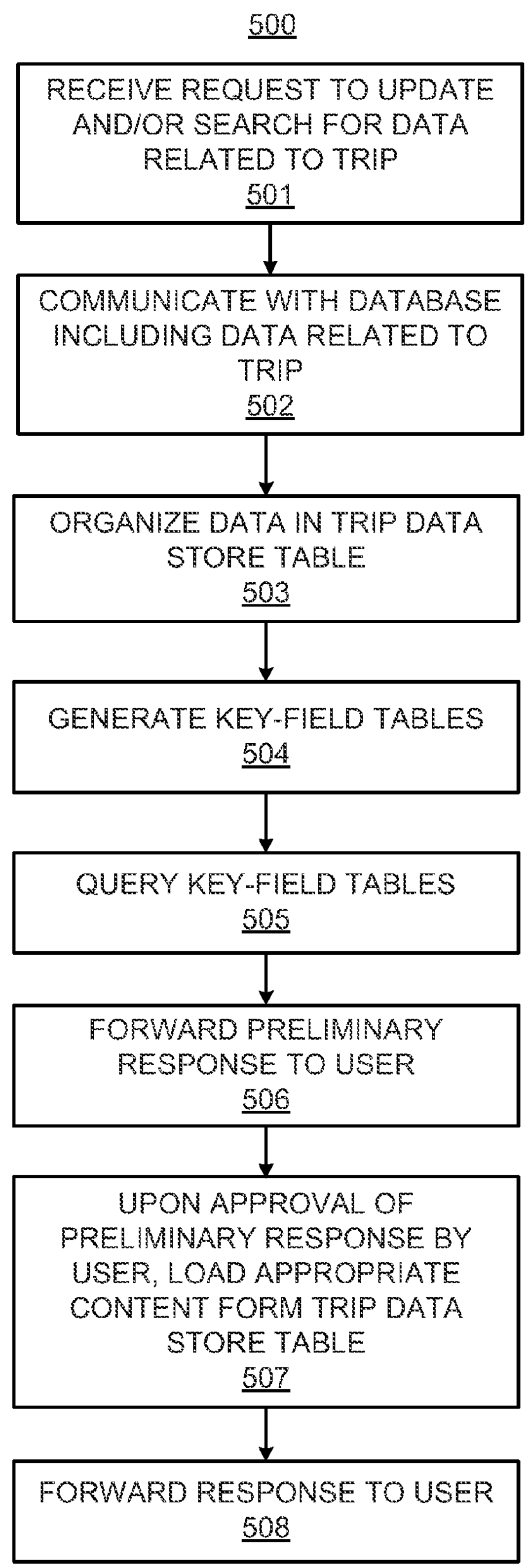
FIG. 13 illustrates a method for travel management, according to an embodiment.

FIG. 13 illustrates a flowchart of a method 500 for travel management, according to an embodiment. The method 500 may be implemented on the travel management system described above with reference to FIGS. 1-12 by way of example and not limitation. The method 500 may be practiced in other systems.

Referring to FIG. 13, at block 501, the method may include receiving a request to update and/or search for data related to a trip. For example, referring to FIG. 1, the system 100 may include the client module 101, which may be designed to make XML based requests to the application module 102 to be processed. The response to the client module 101 may also be a XML based response.

At block 502, the method may include communicating with a database including the data related to the trip. For example, referring to FIG. 1, the application module 102 may provide a communication medium between the client module 101 and the database module 104. The application module 102 may read the XML for data manipulation queries and perform decisions, such as, for example, updating correct index tables in the database 106.

At block 503, the method may include organizing the data in a trip data store table including unique keys respectively identifying trips, and further including index tables related to attributes of the trips and identified by the unique keys. For example, the database 106 may include multiple index tables, such as, for example, the location index table, the image index table, and the landmark index table. As shown in FIG. 2, each index table (e.g., location index table, image index table, and landmark index table) for the data model 107 may include the value 109 and the key (MID) 110 pair. As discussed above, MID may be a MetadatatagId, which may be, for example, a 16 digit ID. As also discussed above with reference to FIG. 3, for the converted XML at 114, for the index column at 115, a column defined as index="true" determines that a value is searchable. For the key-field column at 116, a column defined as key-field="true" determines that a value is presented as part of a view to the client machine as a result of a search result. The index and key-field columns may allow the system 100 to control variable and text values for search and visual presentation. As also discussed above with reference to FIG. 4, for the trip data store table 117, the corresponding tables may include the location index table 118, the landmark index table 119 and the image index table 120. The XML data in the trip data store table 117 may store the entire XML data related to a trip in a single row in a multiple nodes form. The trip data store table 117 may also include multiple columns. Data related to a trip may be stored in the XML format in a single row that is linked with a unique ID. For example, the unique ID may be the row key (MID) 110.

At block 504, the method may include generating key-field tables related to the attributes of the trips and identified by the unique keys and storing corresponding values for key-fields set to true in a corresponding key-field table. For example, referring to FIG. 6, the generated XML response may be the responsibility of the location key-field table 124. Referring to FIGS. 5 and 6, for the trip data store table 117, for every column that has key-field set to "true", the value may be stored in the corresponding key-field tables (e.g., the location key-field table 124) and, as discussed below, the view XML may be sent to a user without loading the trip data store table 117.

At block 505, the method may include querying key-field tables based on the request.

At block 506, the method may include forwarding a preliminary response to the user. The preliminary response may include the data in the key-field table corresponding to the unique key.

At block 507, the method may include, upon approval of the preliminary response by the user, loading appropriate content from the trip data store table identified by the unique key. For example, in order to limit the amount of data loaded for any particular search, the trip data store table 117 may be loaded on demand only after loading of the key-field table (e.g., the location key-field table 124). For example, once the key-field table is searched, upon approval by a user to load a particular record, the trip data store table 117 may be loaded. Referring to FIG. 5, since all the three location columns 125 have key-field set to true, all three values may remain in the database 106 as the XML column family. Thus, when a user searches for a record in the system 100, the user may be presented with links to the most relevant records, with the links being formed using the key-field table. Thus, as discussed above, the trip data store table 117 may be loaded on demand when a user requests further review of a record. Until then, the key-field table may be used to present links to the most relevant records for a search. Further, referring to FIG. 5, a XML example of the trip data store table 117 is shown. For the XML example, at 121, id="location" informs the system 100 that the location index table 118 needs to be populated if index="true". Similarly, at 122, id="landmark" informs the system 100 that the landmark index table 119 is to be updated if index="true". At 123, since the name attribute is not indexed to true (i.e., index="false"), the value is not saved in the location index table 118. If a user were to search for comments, images and reviews, for example, of ABC coffee landmark, the search request would proceed directly to the landmark index table 119 to obtain the trip MID. Based on the trip MID, the system 100 may load the trip XML from the trip data store table 117. The trip XML may include all the data stored in a column family manner in XML format. The XML result may be processed at the client side (i.e., at the client module 101) to create the required HTML views.

At block 508, the method may include forwarding a response to a user. For example, the XML response may be rendered into HTML views to be presented to a user. As discussed above, the client module 101 may be equipped with the parser module 103 to convert the XML response into HTML views. Alternatively, the application module 102 and its associated application layer or service layer may include the parser module 103. The parsing of the XML response at the client end may be performed using, for example, JavaScript. Parsing the XML response at the client end may increase the speed of the parsing operation as opposed to the parsing being performed at the application module 102.

4. Computer Readable Medium

Figure 14:
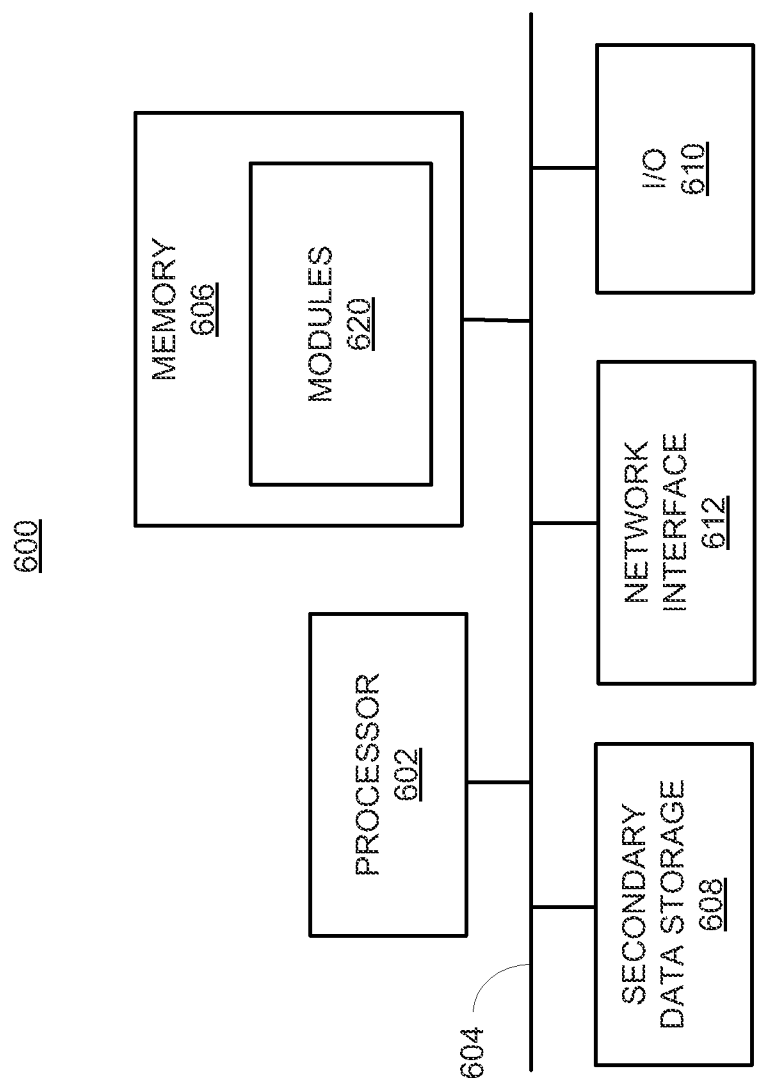
FIG. 14 illustrates a computer system, according to an embodiment.

FIG. 14 shows a computer system 600 that may be used with the embodiments described herein. The computer system 600 represents a generic platform that includes components that may be in a server or another computer system. The computer system 600 may be used as a platform for the system 100. The computer system 600 may execute, by a processor or other hardware processing circuit, the methods, functions and other processes described herein. These methods, functions and other processes may be embodied as machine readable instructions stored on computer readable medium, which may be non-transitory, such as hardware storage devices (e.g., RAM (random access memory), ROM (read only memory), EPROM (erasable, programmable ROM), EEPROM (electrically erasable, programmable ROM), hard drives, and flash memory).

The computer system 600 includes a processor 602 that may implement or execute machine readable instructions performing some or all of the methods, functions and other processes described herein. Commands and data from the processor 602 are communicated over a communication bus 604. The computer system 600 also includes a main memory 606, such as a random access memory (RAM), where the machine readable instructions and data for the processor 602 may reside during runtime, and a secondary data storage 608, which may be non-volatile and stores machine readable instructions and data. The memory and data storage are examples of computer readable mediums. The memory 606 may include modules 620 including machine readable instructions residing in the memory 606 during runtime and executed by the processor 602. The modules 620 may include the modules 101-104 of the system 100 shown in FIG. 1.

The computer system 600 may include an I/O device 610, such as a keyboard, a mouse, a display, etc. The computer system 600 may include a network interface 612 for connecting to a network. Other known electronic components may be added or substituted in the computer system 600.

While the embodiments have been described with reference to examples, various modifications to the described embodiments may be made without departing from the scope of the claimed embodiments.

What is claimed is:

1. A travel management system comprising:

at least one hardware processor;

a non-transitory hardware storage device coupled to the at least one hardware processor;

a client module, executed by the at least one hardware processor, to generate a request to at least one of update and search for data related to a trip; and a database module, executed by the at least one hardware processor, to receive the request and to communicate with a database, wherein the database includes data organized in a trip data store table including unique keys respectively identifying trips, the trip data store table includes a single column including the unique keys respectively identifying trips, each unique key of the unique keys identifies a single trip of the trips, the database further includes for the trip data store table corresponding index tables related to attributes of the trips and identified by the unique keys, there are a plurality of different types of index tables for each of the trips identified in the trip data store table, the index tables include at least a location index table related to a source and a destination of the trip, and a further index table related to one or more stops along a route between the source and the destination, each row of the location index table and the further index table includes a single one of the unique keys, each of the index tables includes an index and a key-field, and an index set to true determines that a value related to an attribute of the trip is searchable, and a key-field set to true determines that the value is to be presented to a user as a search result, the database further includes key-field tables related to the attributes of the trips and identified by the unique keys, corresponding values for key-fields set to true are stored in a corresponding key-field table, and the database module obtains data related to the request from an index table of the index tables to determine a corresponding unique key of the unique keys, and forwards, based on a search of the trip data store table using the corresponding unique key, a response including the route and appropriate content related to the trip to the client module.

2. The travel management system of claim 1, wherein the index tables include value and the unique key pairs, and wherein the value is related to the attribute of a trip.

3. The travel management system of claim 1, wherein the unique key is a unique identification related to the trip from the source to the destination of the trip.

4. The travel management system of claim 1, wherein the database module queries the key-field tables based on the request and forwards a preliminary response to the client module, and upon approval of the preliminary response by the user, the database module loads the appropriate content related to the trip from the trip data store table identified by the unique key.

5. The travel management system of claim 1, wherein the trip data store table stores Extensible Markup Language (XML) data related to the trip in a single row in a multiple nodes form.

6. The travel management system of claim 1, wherein the client module provides live sharing of traffic update information among a closed group of users.

7. The travel management system of claim 1, wherein the client module provides access to a first user's trip information to an authorized second user.

8. The travel management system of claim 1, wherein the client module provides an authorized user the ability to assist a traveler in real-time by updating the trip with alternate route maps, landmarks, images, comments, or reviews.

9. The travel management system of claim 1, wherein the client module provides an authorized user the ability to assist a traveler in real-time by updating the trip with alternate route maps.

10. The travel management system of claim 1, wherein the client module provides an authorized user the ability to assist a traveler in real-time by updating the trip with reviews.

11. The travel management system of claim 1, wherein the client module provides an authorized user the ability to generate a customized route related to the trip, and further provides downloading of the customized route by a first user.

12. The travel management system of claim 1, wherein the client module provides setting of a plurality of alerts at predetermined intervals during the trip based on alert preferences that are specified by a user.

13. The travel management system of claim 1, wherein the client module generates a unique trip uniform resource locator (URL) that is based on the unique key, and provides the unique trip URL to a user for permitting access to the trip by further users.

14. The travel management system of claim 1, wherein the trip data store table includes a location index, and wherein the location index set to true indicates that the location index table is to be populated.

15. A method for travel management, the method comprising:

receiving a request to at least one of update and search for data related to a trip;

communicating with a database including the data related to the trip;

organizing, by a hardware processor, the data in a trip data store table including unique keys respectively identifying trips, and further including corresponding index tables related to attributes of the trips and identified by the unique keys, wherein the trip data store table includes a single column including the unique keys respectively identifying trips, each unique key of the unique keys identifies a single trip of the trips, there are a plurality of different types of index tables for each of the trips identified in the trip data store table, the index tables include a location index table related to a source and a destination of the trip, and a further index table related to one or more stops along a route between the source and the destination, each row of the location index table and the further index table includes a single one of the unique keys, each of the index tables includes an index and a key-field, and an index set to true determines that a value related to an attribute of the trip is searchable, and a key-field set to true determines that the value is to be presented to a user as a search result, the database further includes key-field tables related to the attributes of the trips and identified by the unique keys, and corresponding values for key-fields set to true are stored in a corresponding key-field table;

obtaining data related to the request from an index table of the index tables to determine a corresponding unique key of the unique keys; and forwarding, based on a search of the trip data store table using the corresponding unique key, a response including the route and appropriate content related to the trip to a user.

16. The method of claim 15, further comprising:

querying the key-field tables based on the request;

forwarding a preliminary response to the user; and upon approval of the preliminary response by the user, loading the appropriate content related to the trip from the trip data store table identified by the unique key.

17. The method of claim 15, wherein the index tables include value and the unique key pairs, and wherein the value is related to the attribute of a trip.

18. The method of claim 15, wherein the unique key is a unique identification related to the trip from the source to the destination of the trip.

19. The method of claim 15, wherein the trip data store table stores Extensible Markup Language (XML) data related to the trip in a single row in a multiple nodes form.

20. The method of claim 15, further comprising:

providing live sharing of traffic update information among a closed group of users.

21. A non-transitory computer readable medium having stored thereon a computer executable program for travel management, the computer executable program when executed causes a computer system to:

receive a request to at least one of update and search for data related to a trip;

communicate with a database including the data related to the trip;

organize, by a hardware processor, the data in a trip data store table including unique keys respectively identifying trips, and further including corresponding index tables related to attributes of the trips and identified by the unique keys, wherein the trip data store table includes a single column including the unique keys respectively identifying trips, each unique key of the unique keys identifies a single trip of the trips, there are a plurality of different types of index tables for each of the trips identified in the trip data store table, the index tables include a location index table related to a source and a destination of the trip, and a further index table related to one or more stops along a route between the source and the destination, each row of the location index table and the further index table includes a single one of the unique keys, each of the index tables includes an index and a key-field, and an index set to true determines that a value related to an attribute of the trip is searchable, and a key-field set to true determines that the value is to be presented to a user as a search result, the database further includes key-field tables related to the attributes of the trips and identified by the unique keys, and corresponding values for key-fields set to true are stored in a corresponding key-field table;

obtain data related to the request from an index table of the index tables to determine a corresponding unique key of the unique keys; and forward, based on a search of the trip data store table using the corresponding unique key, a response including the route and appropriate content related to the trip to a user.

* * * * *